(12) United States Patent
Natarajan et al.

(10) Patent No.: US 7,428,544 B1
(45) Date of Patent: *Sep. 23, 2008

(54) SYSTEMS AND METHODS FOR MAPPING E-MAIL RECORDS BETWEEN A CLIENT AND SERVER THAT USE DISPARATE STORAGE FORMATS

(75) Inventors: Krishnamurti Natarajan, Hyderabad (IN); Manikandan Thangarathnam, Tamil Nadu (IN)

(73) Assignee: Microsoft Corporation, Redmond, WA (US)

( * ) Notice: Subject to any disclaimer, the term of this patent is extended or adjusted under 35 U.S.C. 154(b) by 824 days.

This patent is subject to a terminal disclaimer.

(21) Appl. No.: 10/170,041

(22) Filed: Jun. 10, 2002

(51) Int. Cl.
  *G06F 7/00* (2006.01)
  *G06F 17/00* (2006.01)
  *G06F 15/16* (2006.01)
  *G06F 17/30* (2006.01)

(52) U.S. Cl. .............. 707/101; 707/3; 707/10; 707/100; 709/206

(58) Field of Classification Search .......... 707/101, 707/201, 3, 10, 100; 709/206
See application file for complete search history.

(56) References Cited

U.S. PATENT DOCUMENTS

| | | | |
|---|---|---|---|
| 5,848,395 A | 12/1998 | Edgar et al. | |
| 5,892,909 A | 4/1999 | Grasso et al. | |
| 5,919,247 A | 7/1999 | Van Hoff et al. | |
| 5,923,848 A | 7/1999 | Goodhand et al. | |
| 5,966,714 A | 10/1999 | Huang et al. | |
| 6,004,276 A | 12/1999 | Wright et al. | |
| 6,064,977 A | 5/2000 | Haverstock et al. | |
| 6,070,160 A | 5/2000 | Geary | |
| 6,073,137 A * | 6/2000 | Brown et al. | 707/104.1 |
| 6,175,831 B1 | 1/2001 | Weinreich et al. | |
| 6,182,121 B1 | 1/2001 | Wlaschin | |
| 6,269,369 B1 | 7/2001 | Robertson | |
| 6,301,621 B1 | 10/2001 | Haverstock et al. | |
| 6,374,300 B2 * | 4/2002 | Masters | 709/229 |
| 6,393,421 B1 | 5/2002 | Paglin | |
| 6,418,448 B1 | 7/2002 | Sarkar | |
| 6,446,092 B1 | 9/2002 | Sutter | |
| 6,457,879 B1 | 10/2002 | Thurlow et al. | |
| 6,563,912 B1 * | 5/2003 | Dorfman et al. | 379/88.13 |
| 6,564,264 B1 | 5/2003 | Creswell et al. | |
| 6,574,617 B1 | 6/2003 | Immerman et al. | |
| 6,643,669 B1 * | 11/2003 | Novak et al. | 707/201 |
| 6,714,916 B1 | 3/2004 | Robertson et al. | |
| 6,721,871 B2 | 4/2004 | Piispanen et al. | |

(Continued)

OTHER PUBLICATIONS

U.S. Appl. No. 60/364,648, Crocker et al, Method and Apparatus for Synchronizing Files over a Network, filed Mar. 15, 2002. Provisional not furnished with the office action.*

(Continued)

*Primary Examiner*—Uyen T. Le
*Assistant Examiner*—Cheryl M Shechtman
(74) *Attorney, Agent, or Firm*—Lee & Hayes, PLLC

(57) ABSTRACT

An e-mail application program operating on a client stores e-mail records in a hierarchical database. The client is linked to a server that stores e-mail records in a flat database. The e-mail records stored in the hierarchical database are mapped to the e-mail records stored in the flat database and vice versa. The mapped e-mail records are then stored in a mapping table.

17 Claims, 10 Drawing Sheets

U.S. PATENT DOCUMENTS

| | | | |
|---|---|---|---|
| 6,725,269 B1 * | 4/2004 | Megiddo | 709/228 |
| 6,732,092 B2 | 5/2004 | Lucas et al. | |
| 6,785,721 B1 | 8/2004 | Immerman et al. | |
| 6,845,383 B1 | 1/2005 | Kraenzel et al. | |
| 6,883,000 B1 | 4/2005 | Gropper | |
| 6,954,782 B2 | 10/2005 | Thurlow et al. | |
| 7,031,973 B2 | 4/2006 | Natarajan et al. | |
| 7,035,839 B1 | 4/2006 | Gillespie et al. | |
| 7,194,419 B2 | 3/2007 | Robertson et al. | |
| 2001/0032245 A1 * | 10/2001 | Fodor | 709/206 |
| 2001/0034771 A1 | 10/2001 | Hutsch | |
| 2002/0046224 A1 | 4/2002 | Bendik | |
| 2002/0052195 A1 | 5/2002 | Lee | |
| 2002/0091702 A1 | 7/2002 | Mullins | |
| 2002/0156688 A1 | 10/2002 | Horn et al. | |
| 2002/0169748 A1 | 11/2002 | Macholda | |
| 2003/0009295 A1 | 1/2003 | Markowitz et al. | |
| 2003/0023580 A1 | 1/2003 | Braud et al. | |
| 2003/0084078 A1 | 5/2003 | Torii et al. | |
| 2003/0177194 A1 * | 9/2003 | Crocker et al. | 709/206 |
| 2003/0191806 A1 * | 10/2003 | Osterberg et al. | 709/206 |
| 2003/0229644 A1 | 12/2003 | Natarajan | |
| 2003/0233351 A1 * | 12/2003 | Naeve et al. | 707/3 |
| 2006/0064428 A1 * | 3/2006 | Colaco et al. | 707/101 |
| 2006/0095575 A1 | 5/2006 | Sureka et al. | |

OTHER PUBLICATIONS

Allocchio et al, "RFC1664: Using the Internet DS to Distribute RFC1327 Mail Address Mapping Tables", Aug. 1994.

IBM Technical Disclosure Bulletin, "Self-Defining Disk Directory with Common Accessing Algorithm;" Dec. 1, 1990, vol. 33, Issue 7, pp. 71-74.

IBM Technical Disclosure Bulletin, "On-Line Desktop Address Book and Auto Dialer"; Jul. 1, 1992, vol. 35, Issue 2, pp. 439-441.

Wikipedia (www.wikipedia.org) "flat file"; Aug. 15, 2005.

* cited by examiner

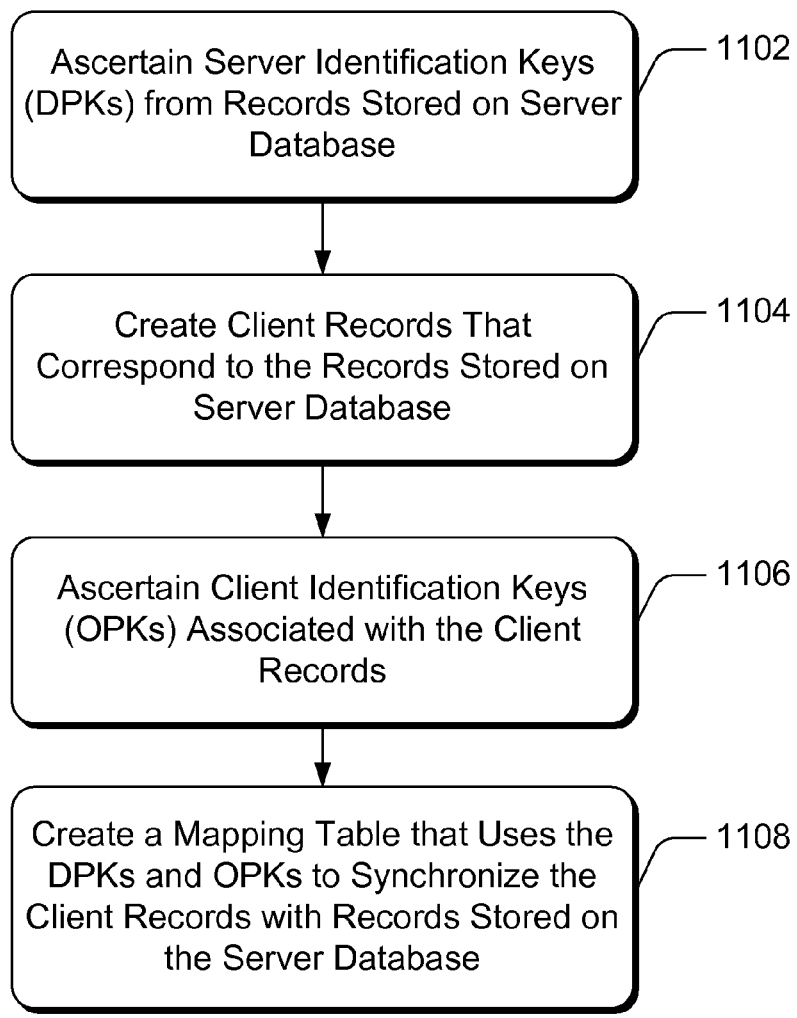

SYSTEMS AND METHODS FOR MAPPING E-MAIL RECORDS BETWEEN A CLIENT AND SERVER THAT USE DISPARATE STORAGE FORMATS

TECHNICAL FIELD

This invention relates to application software pertaining to electronic mail (e-mail), and more specifically, to mapping e-mail records between a client and server that use disparate storage formats.

BACKGROUND

MICROSOFT® OUTLOOK® message software is an e-mail application program designed to function interchangeably with a MICROSOFT® EXCHANGE SERVER. Both store data in the same format. They both use a hierarchical style e-mail database. Folders and subfolders are created to hold e-mail messages, contact properties of different individuals and entities, calendar appointments, tasks and other related items that are stored as individual "records."

There is a dilemma, however, when a client and server use a disparate storage format for maintaining data. Suppose, for instance, messaging software using a hierarchical style e-mail database sold under the name MICROSOFT® OUTLOOK® operating on a client device connects to an e-mail database maintained on a server that stores messaging information in a flat database sold under the name DOMINO/LOTUS NOTES SERVER by IBM®. DOMINO/LOTUS NOTES SERVER stores messaging information in a flat database where each property associated with an address is stored as a record in a single folder. On the other hand, as mentioned above, messaging software sold under the name OUTLOOK® maintains address properties in a hierarchical fashion with folders and subfolders. Each record is stored in the folder to which its relates, and there is no concept of using references. Accordingly, records received from a server that stores messaging information in a flat database cannot be readily stored in a client database compatible with hierarchical style e-mail software, because the records are not in a format in which the client can store, and at a later time, read back and understand Thus, there is a lack of flexibility associated with open deployment of clients and servers running e-mail application software, where the client and server use disparate storage formats to store data associated with the e-mail application software.

SUMMARY

Mapping e-mail records between a client and server that use disparate storage formats is described. In one implementation, and e-mail application program operating on a client stores e-mail records in a hierarchical database. The client is linked to a server that stores e-mail records in a flat database. The e-mail records stored in the hierarchical database are mapped to the e-mail records stored in the flat database and vice versa. The mapped e-mail records are then stored in a mapping table.

BRIEF DESCRIPTION OF THE DRAWINGS

The detailed description is described with reference to the accompanying figures. In the figures, the left-most digit(s) of a reference number identifies the figure in which the reference number first appears.

FIG. 10 illustrates another implementation of the mapping table with an additional field.

FIG. 11 is a flow chart illustrating a process for replicating changes made to records between the disparate databases through the use of the mapping table.

DETAILED DESCRIPTION

The following discussion is directed to systems and methods for connecting a client to a server, when the client and server employ a different storage format for storing information associated with an e-mail application program. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Example System Architecture

Figure 1:
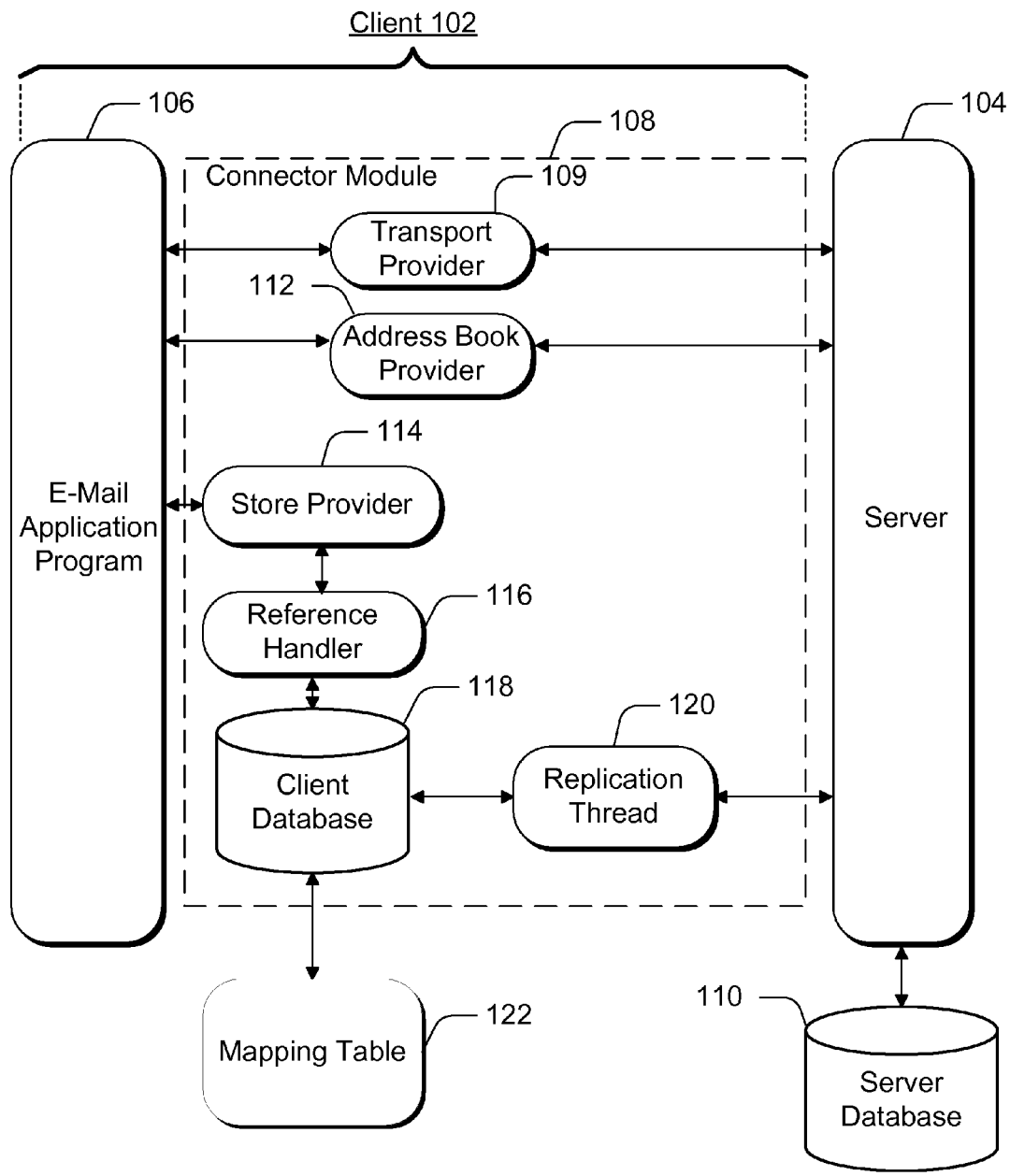
FIG. 1 shows functional components of an example electronic mail (e-mail) system.

FIG. 1 shows functional components of an example electronic mail (e-mail) system 100. The exemplary implementations are directed to features associated with the e-mail system 100. E-mail system 100 includes a client side and server side. The client side includes a client 102 which is any type of computer device (see, e.g., computer 1302 in FIG. 13 to be described) that utilizers a processor and has the capability of executing instructions and logic associated with an e-mail application program. Examples of such devices include, but are not necessarily limited to: personal computers, portable computers, work stations, personal digital assistants, mobile communication platforms and other related computing devices.

Contained within the client 102 is an e-mail application program 106 that interacts with both client side and server side components. In one exemplary implementation, the e-mail application program 106 is represented by the messaging software sold under the name MICROSOFT® OUTLOOK®, which is a workgroup personal information management program produced by Microsoft Corporation of Redmond, Wash., USA. Briefly described, the program allows users to manage their own calendar, messages, tasks, notes and contacts and to share this information with others. Like many personal information managers, this program 106 is divided into several modules, including a calendar manager, a task list manager, an address book manager, a message manager (e-mail) and a notes manager. Of particular interest to this description is the connector module 108 to be described in more detail.

The server side includes a server 104 as well as a server database 110. The server 104 represents a class of servers capable of servicing clients. In one exemplary implementation, the server 104 is represented by the server system sold as IBM® LOTUS NOTES/DOMINO SERVER system, which is a server system produced by International Business Machines Corporation of Armonk, N.Y., USA. Although the exemplary implementations will generally be described in the context of these client and server side representations (messaging software sold under the name OUTLOOK® and messaging software sold under the name DOMINO), it is possible that other client side and server side platforms could be used in accordance with the principles and illustrations described herein.

In the exemplary implementations, the client 102 and server 104, store and manipulate data associated with the e-mail application program 106 in different formats. For instance, message software sold under the name MICROSOFT® OUTLOOK® is designed to operate seamlessly with servers sold under the name MICROSOFT'S® EXCHANGE®, which interprets and stores e-mail data in the same format whether on the client side or server side.

To ensure that there is interoperability between messaging software sold under the name MICROSOFT® OUTLOOK® on client 102 and server sold under the name LOTUS NOTES on the IBM® DOMINO SERVER 104, a connector module 108 is used to integrate messaging interoperability and connectivity between them. Module 108 includes Messaging Application Programming Interface (MAPI) modules that enable messages and data to be sent from the client 102 to server 104, and vice versa.

A transport provider module 109 is responsible for sending messages to and receiving messages from connector module 108. The transport provider 109 performs several functions related to messaging distribution. These include, for instance, informing the e-mail application program 106 when a new message has been received from server 104, and invoking message preprocessing and post-processing. The transport provider 109 also handles message transmission and reception between the client 102 and server 104.

The address book provider module 112 is used to manage address contact information from an address book stored in both the client and server databases 118 and 110, respectively. In other words, address book provider 112 handles access to directory and contact information, the contents of which, can either be obtained from the client database 118 when not in session with the server 104, or from server database 110 when client 102 is in session with server 104, vis-à-vis server database 110.

The store provider module 114 handles the storage and retrieval of messages and other information for application program 106 as well as application modules such as address book module 122. Information stored by e-mail application program 106 is stored and organized using a hierarchical system, which is implemented in multiple levels, with containers called folders holding messages of different types. There is no limit to the number of levels provided by store provider 114.

Figure 2:
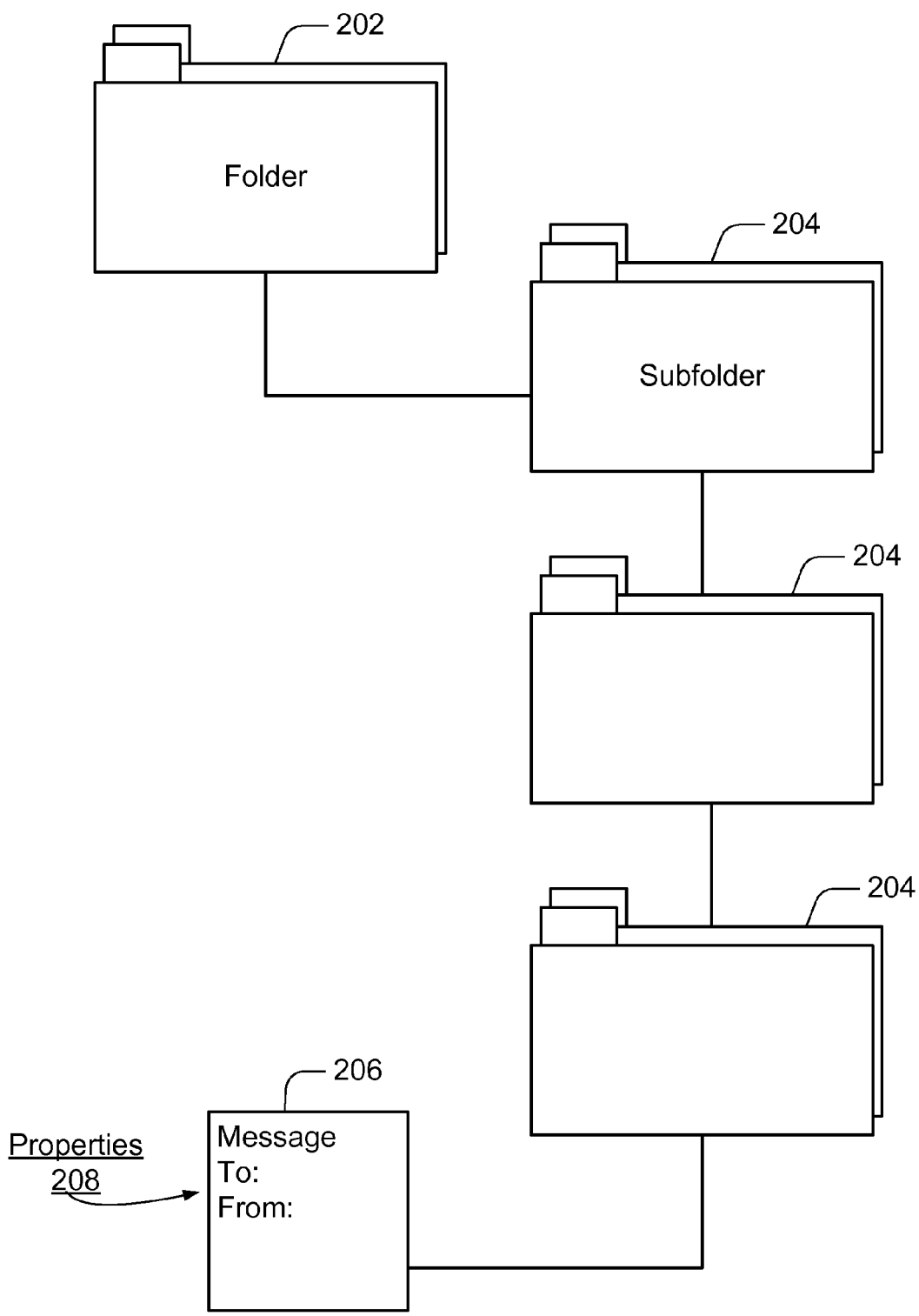
FIG. 2 is a diagram illustrating the hierarchical arrangement of how an e-mail application program can store Messaging Application Programming Interface (MAPI) information using folders and subfolders.

FIG. 2 is a diagram illustrating the hierarchical arrangement of how application program 106 may store MAPI information using folders 202 and subfolders 204. Store provider 114 allows each application to access information stored in each of the folder(s) 202 or subfolder(s) 204 that reside in client database 118. Each of the folders contents, depending on the type of folder, is possibly viewable by a user. For example, folder 202 can represent an inbox where records are stored, whereas folders 204 can represent drafts or archived messages. In other words, all information stored in client database 118 is stored in a MAPI data store. Client database 118 arranges all its records in MAPI folders and MAPI messages. Each folder 202 can contain subfolders 204 or one or more messages 206. Messages are units of data transferred from one user to another such as an e-mail message, which can be stored as a record. On the client side, a "record" is an individual data structure that refers to either a mail item or folder (messages, etc.) that can be individually accessed and potentially viewed by a user. Records on the client side are stored in client database 118 in folders 202 or 204.

In the MAPI store, messages (objects) are composed of properties. In most cases, fields, (such as "To," "From," "Subject") map directly to a MAPI property 208. Additionally, folders 202, subfolders 204 and messages 206 have certain properties 208 describing them, for example, PR_ENTRYD contains a unique identifier to a message 206 or folder 202. PR_DISPLAY_NAME property stores the name of the folder and messages. The database 118 permits interfaces, IMPAIFolder and IMessage interfaces, to store and retrieve data from the database 118.

Figure 3:
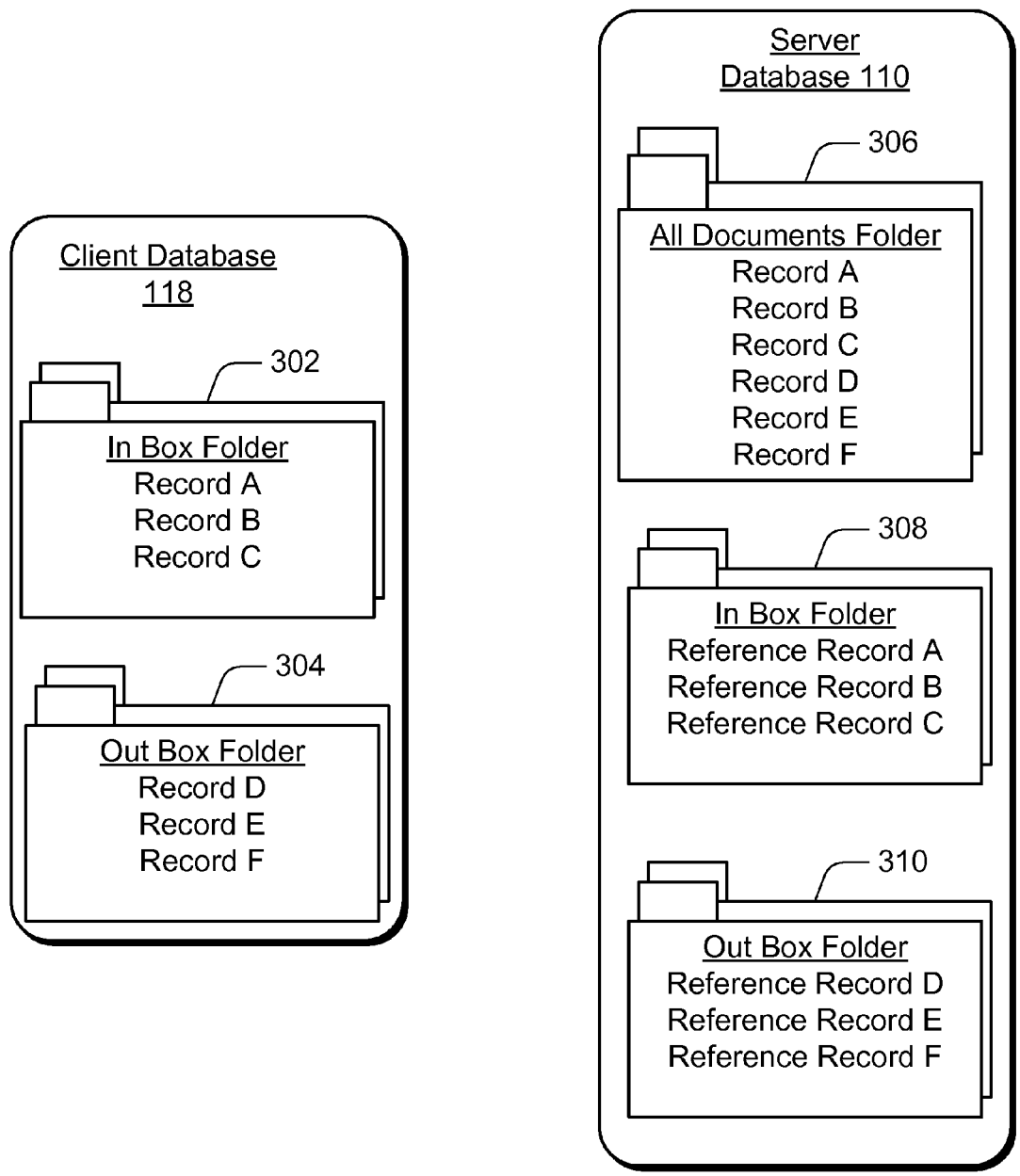
FIG. 3 illustrates how "record" are stored in server database (flat database) versus a client database (hierarchical).

FIG. 3 illustrates how "records" are stored in server database (flat database) versus a client database (hierarchical database). Shown on the left hand side, is an exemplary portion of client database 118 including an inbox folder 302 and an outbox folder 304. Contained within inbox folder 302 are individual Records A, B and C, and within outbox folder 304 are individual Records D, E and F.

Shown on the right hand side of FIG. 3, is an exemplary portion of server database 110, which includes an All Documents folder 306. Contained within All Documents folder 306 are Records A, B, C, D, E and F. The All Documents folder 306 contains all the records associated with e-mail application program 106 stored in server database 110, without regard to which folder the record is actually viewable by a user. Also contained in server database is an inbox folder 308 and an outbox folder 310. Each of these folders, inbox 308 and outbox 310, contain references (are non-data-structure elements) that point to a specific record in which they reference. For instance, when a user opts to view the inbox 308, the references contained therein link the actual records the All Documents folder 306 so they are in a viewable format in the inbox. For example, Reference Record A references Record A, Reference Record B references Record B and so forth. A single record in the All Documents folder 306 can be referenced by a plurality of references.

So the server database 110 contains only one record, which may be referenced by a plurality of references, whereas the client database 118 contains many unique records which are actually stored as records in each respective folder in which the record is intended to be viewed. As shall be explained in more detail, the reference handler module 116 uses a mapping table 122 to store records received from the server 104 and synchronize the different storage formats used by the client 102 and server 104.

A replication thread module 120 also uses the mapping table 122 to replicate the databases 110 and 118. The replication thread module 120 is a bidirectional module that ensures that changes to records performed on the client 102 or received from the server 104 are replicated. The process of handling multiple references and replication of the server database in a format compatible for the e-mail application program 106 shall now be described in more detail.

Handling Multiple References on the Client

As described above, database 118 is created to replicate the mail database in server database 110. The storage and the type of folders used to store the information in these two databases differ, as described below. In database 118, a reference mechanism is used to show which folder the records in a particular folder (308 and/or 310) each record belongs. Accordingly, whenever a record needs to associate with a particular folder, a reference of that record is added to the folder 308 and/or 310). It is possible that the same record can be referenced by different folders but the server database 110 typically contains only one record in the All Documents folder 306.

In the client database 118, there is no concept of references. As shall be explained, instead the reference handler module 116 creates a new record for each reference in the server database 110. Even if multiple references point to the same record, the reference handler module creates a unique record which is stored in the same folder as the reference indicates. So, although there may be multiple records in the database 118 that are essentially the same content wise, they are actually unique records. In this way, the connector 108 allows the client database 118 to behave the same way the server database 110 behaves when there are references, without actually using the referencing techniques. The mapping table 122 is used to map records stored in the client database 118 back to the records stored in the server database 110.

Figure 4:
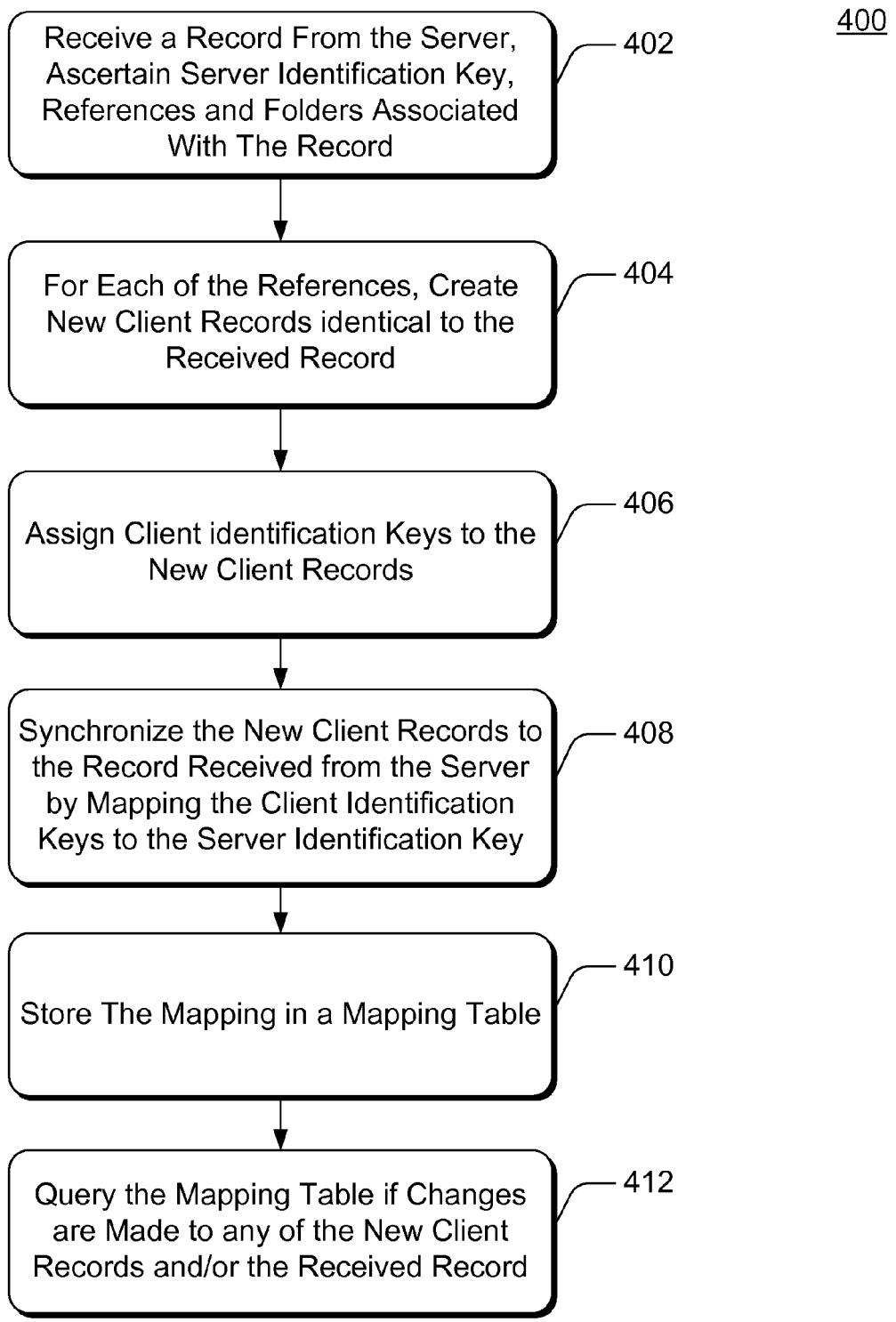
FIG. 4 is a flow chart illustrating a process for mapping multiple references associated with records from a server database to records stored in a client database.

FIG. 4 is a flow chart illustrating a process for mapping multiple references associated with records from a server database 110 to records stored in a client database 118. Process 400 includes various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on client 102.

Figure 5:
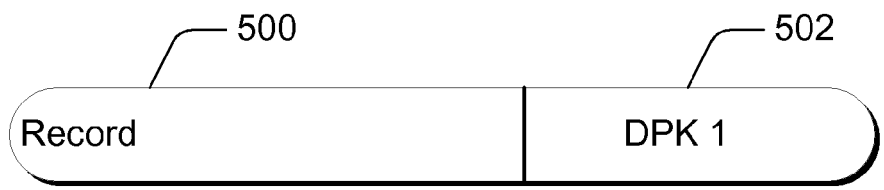
FIG. 5 shows an example record maintained by the server that has an associated server identification key.

At a block 402, client 102 receives a record. The record can be a mail item or some other e-mail item such as a folder. Next, the client 102 through the connector module 108 ascertains the server identification key associated with the record. FIG. 5 shows an example record 500 maintained by server 104 that has an associated server identification key 502. The server identification key 502 uniquely identifies the record 500 from all other records in the All Documents folder 306. The server identification key is referred to as a "DOMINO Primary Key" (DPK) in the DOMINO SERVER, so in the example shown in FIG. 5, the server identification key for record 500 is "DPK1."

Record 500 may also be referenced by one or more folders (such as by folders 308 and 310). That is, record 500 can be viewed by a user in one or more folders (e.g., 308, 310). Each folder contains the list of DPKs that are referenced in them. Accordingly, each reference, for record 500 is ascertained.

Figure 6:
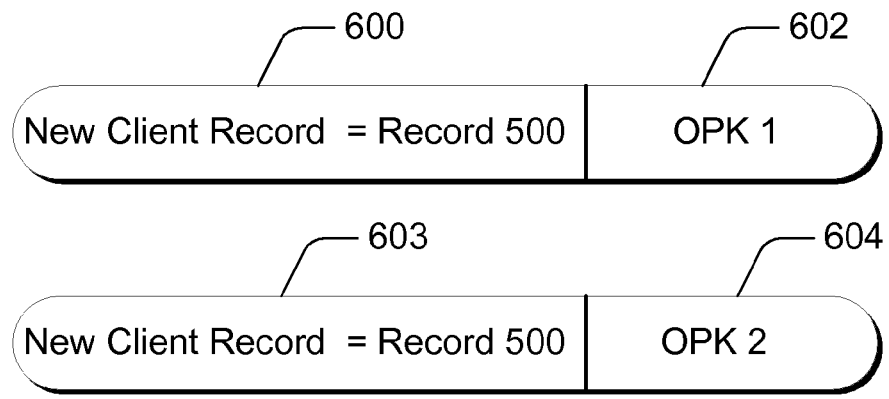
FIG. 6 shows two new client records created for each reference associated with a record from the server.

At a block 404, for each of the references ascertained for record 500, the reference handler module 116, creates new client records identical to the received record 500. In this instance, "identical" means that majority of the records are primarily the same, but the new client records can include additional information associated with the client 102, for maintaining and storing the new client records. For example, FIG. 6 shows two new client records 600 and 603 created for each reference associated with a received record from server 104. For discussion purposes, suppose the new client records 600 and 603 are identical to record 500. It should be noted that once the new client records are created they can be stored in the folders indicated by the reference(s) associated with the received record 500 from server 104.

Referring to FIGS. 4 and 6, at a block 406, for each new client record created 600 and 603 a client identification key 602 and 604 is assigned to the new client records 600 and 603, respectively. The client identification key uniquely identifies the new client records 600 and 603. The client identification key on the client side is referred to as the "OUTLOOK Primary Key" (OPK).

At a block 408, the client records are synchronized the record received from the server by mapping the client identification keys 602 and 604 (OPK1 and OPK2) back to the server identification key DPK 1 502 for record 500.

Figure 7:
FIG. 7 shows the example contents of a mapping table.

At a block 410, this is accomplished by storing the mapping relationship in a mapping table 122. FIG. 7 shows the example contents of a mapping table 122. The mapping table 122 includes the client identification keys OPK1 and OPK2 on the left hand column (also referred to as a field) 702 with rows corresponding to the identical server identification key DPK 1 in the right hand column (also referred to as a field) 704. There are no limitations to the number of additional fields that can be included in the mapping table 122.

At a block 412, in the event that a user action creates a change to any of the new client records 600 to 603 and/or the received record 500, than all related records need to be updated to ensure that they are synchronized. The contents of the mapping table 122 are queried to ascertain all records affected by the change. A "change" can include a deletion of a record, a modification to a record, an addition to a record, or a move of operation where a record is moved from a source folder to destination folder. Once the all the records are identified that correspond to the same server identification key, the records as well as the contents of the mapping table are updated to ensure that the records and identification keys are synchronized (re-synchronized) on both the client and server sides, to reflect the changes by the user.

Constructing the Mapping Table

Figure 8:
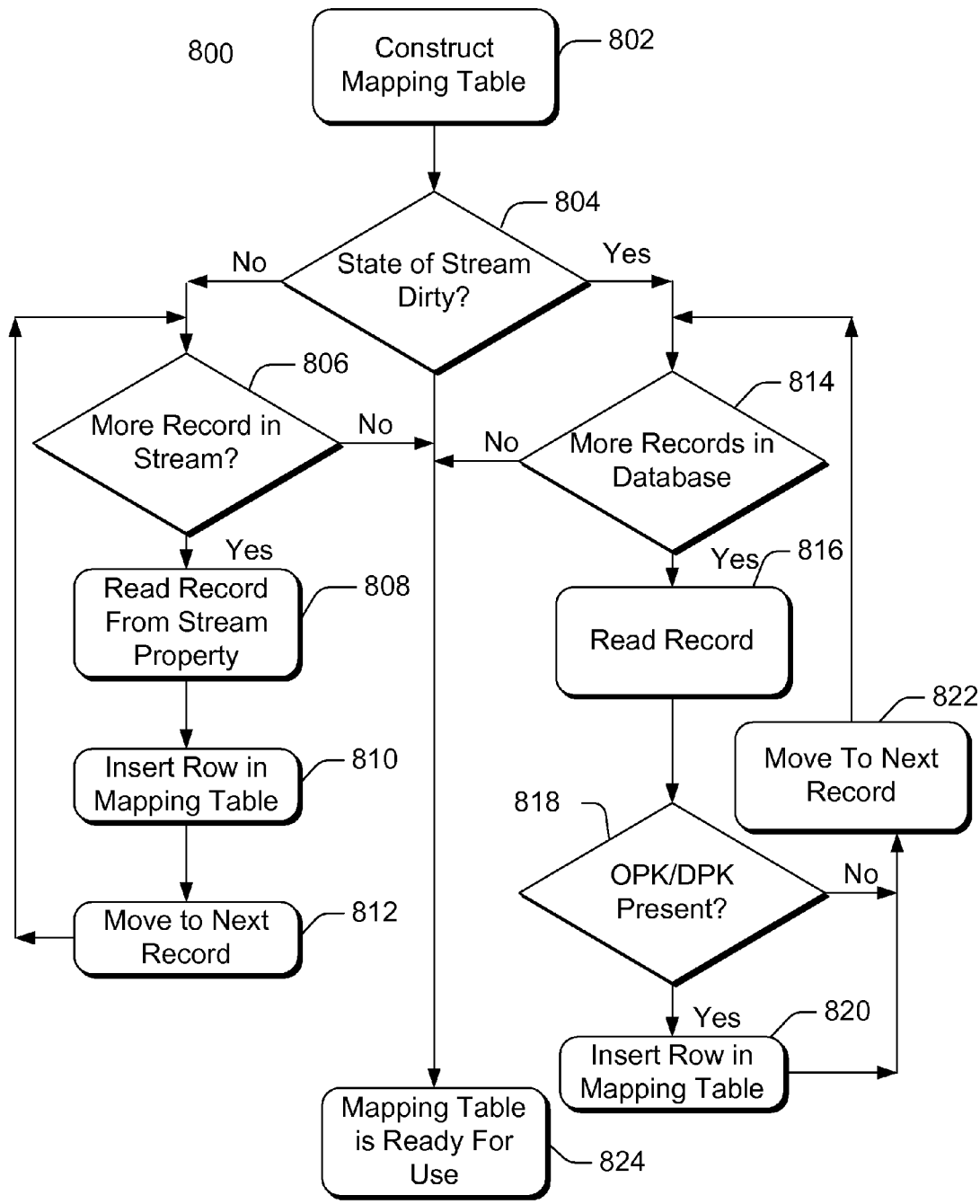
FIG. 8 is a flow chart illustrating a process for constructing the mapping table.

FIG. 8 is a flow chart illustrating a process 800 for constructing the mapping table 122. Process 800 includes various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on client 102.

At a block 802, client 102 initiates creating a mapping table 122. For example, the process of creating the mapping table 122 can be initiated at various times, but must begin the first time the e-mail application program 106 is launched in connection with server 104.

At a block 804, the replication thread 120 checks whether the data stream flowing from the server 104 to the client 102 is dirty. The data stream is dirty when client has worked offline and the data stored in client database 118 is not update with e-mail data stored in server database 110.

Assuming the state of stream is not dirty, then at blocks 806 and 808, the table 122 can be constructed by reading the stream property. The stream property is stored in database 118 when a user exists the e-mail application program 106. The stream property could also be stored at other times. When the user restarts e-mail application program 106, the stream property is read to build the table. At a block 810, for each record, a row is inserted in the mapping table 122. At a block 812, the next record is read and stored in the mapping table 122. This process continues until there not more records in the stream as indicated at a block 824.

If the data stream is dirty at block 804, then process 800 proceeds down the right hand side starting with a block 814. The data stream is checked each time a user launches the e-mail application program 106. At block 814, the connector ascertains whether there any more records in the client database 118. If not then the mapping table is ready for use as indicated in block 824.

On the other hand, if there are more records, than at a block 816 the record is read from the client database 118.

Next, at block 818 it is determined whether there are OPK and DPK present in the record. The presences of OPK/DPK are checked, because only if both are present can we construct a mapping between them. Otherwise, the changes from one database to the other cannot be replicated. If OPK/DPK are not present then at block 822, process 800 advances to the next record.

If the OPK and DPK are present, then at a block 820 these keys are inserted in a row of the mapping table 122 and the process 800 continues until the mapping table 122 is ready for use as indicated in block 824.

Handling Multiple References When Updates are made to Records

Figure 9:
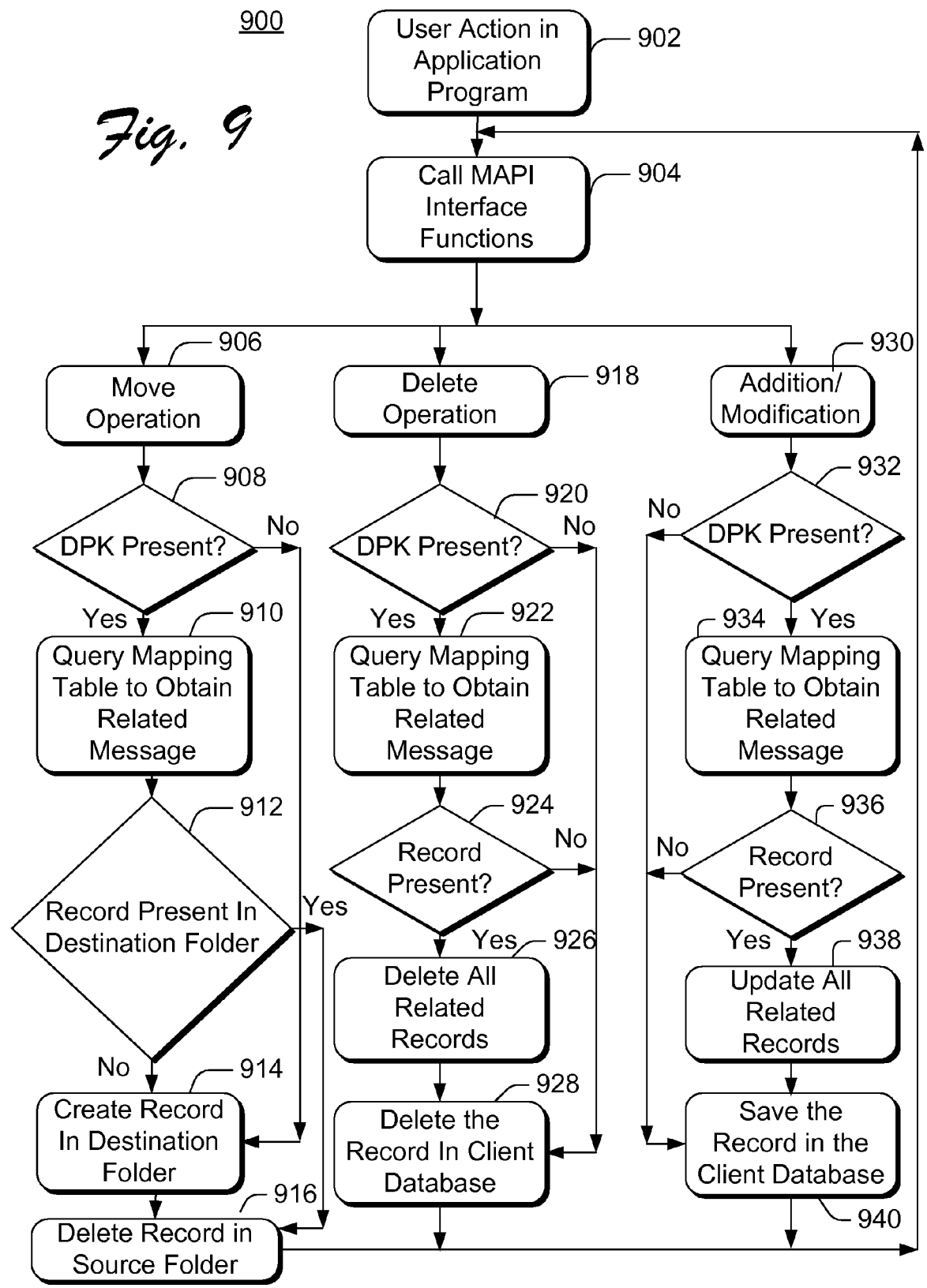
FIG. 9 is a flow chart illustrating a process for handling references when a user performs operations using the e-mail application program.

FIG. 9 is a flow chart illustrating a process 900 for handling references when a user performs operations using the e-mail application program 106. Process 900 includes various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on client 102.

At a block 902, user performs an operation using the e-mail application program 106, such as modifying an item, moving an item from one folder to another, deleting an item, adding an item and other related operations. The "item" may be any e-mail related folder, message, contact, or other item pertaining to messaging software.

At a block 904, MAPI interface functions are called to perform a user requested action. The action can include a move operation (see block 906) a delete operation (see block 918) and/or an addition/modification operation (see block 930). Connector 108 is a MAPI service provider. Connector 108 uses the MAPI function, Create/Table to build a table data object (ITableData object). Connector 108 uses the ITableData functions to access mapping table 122. Usage of the ITableData object in the mapping table makes it easily scalable and highly reliable. The most frequent operation in the mapping table (as shall as described) is the Query operation (read operation). In the query operation a new view from the table 122 is obtained. Connector 108 performs the query operations using the interface functions of IMAPITable which enhances out performance. There is no limitation to the number of fields in the mapping table.

The movable operation shall be described first. Block 906 is initiated after a user moves a record (moves an item that is stored as record), from a source folder to a destination folder. Accordingly, e-mail application program 106 calls the store provider 114 obtain the record from the source folder and ascertain the OPK from the record.

At a block 908, store provider 114 uses the OPK to query mapping table 122 to obtain a corresponding DPK for the record. A determination is made whether the DPK is present, in the record. Assuming a DPK present then at a block 910, mapping table 122 is again queried using the DPK to obtain all related records in the client database 118.

At a block 912, assuming there are related records, a determination is made whether the related record is already present in the destination folder. If according to the "yes" branch of block 912 the related record is in the destination folder, then according to a block 916 all that is needed to do is to delete the record from the source folder. On the other hand, if any related records are not present in the destination folder, then at a block 914 a new record needs to be created and stored in the destination folder. Then at a block 916, the original record is deleted from the source folder.

The delete operation shall now be described. Block 918 is initiated after a user deletes a record from a folder. The e-mail application program 106 calls the store provider 114 to obtain the record from a folder and ascertain the OPK. Once the OPK is ascertained for the record, then at a block 920 a determination is made whether the corresponding DPK is present from the mapping table 122. If there is no DPK present, then the record can be immediately deleted from the client database 118 as indicated in a block 928.

If there is a DPK present for the record, then at a block 922 the mapping table is queried to ascertain whether there are any other related records in the database 122.

At a block 924, if no related records exist that correspond to the DPK, then according to block 928 the record is deleted from the client database 118. If at block 924 there are related records present, then at a block 926 all related records are deleted and the record is deleted in the client database 118. Then, at block 928, the record can be deleted from the client base 118. The addition/modification operation shall now be described. Block 930 is initiated after a user modifies a record in a folder. The e-mail application program 106 calls the store provider 114 to obtain the record from a folder and ascertain the OPK. Once the OPK is ascertained for the record, then at a block 920 a determination is made whether the corresponding DPK is present from the mapping table 122. If there is no DPK present, then according to a block 940 the record can be saved in the client database 118.

If a DPK is present, then at a block 934, the mapping table is queried to obtain any related messages using the DPK to search the table 122. If, at block 936, there are no related records in the client database 118, then the modified or added record can be saved in the database 118, as indicated by block 940.

If at block 936, there are related records, then according to block 938, all related records are updated and the updated record is saved in the client database 118.

Using the Mapping Table When Replicating Changes from Client to Server

The use of the mapping table is minimal when making replicating changes from the client to the server, because a maser copy of data is always updated on the server. The mapping table 122 is used to obtain the DPK from OPK. If the DPK is not able to be ascertained from the mapping table, then it is considered a new item created in the client database 118. In this case, a new item (i.e., a record) is created in the server database 110.

Using the Mapping Table when Replicating changes from Server to Client

When connector 108 requests changes from the server database 110, it provides a list of DPKs and the type of action performed on each record. The action can be either addition/modification or deletion as mentioned above.

For addition/modification, the connector 108 only obtains the DPK of a record form its parent folder. Connector 108 queries the mapping table 122 to check for a row corresponding to the DPK of the record. The parent record's folder DPK obtained from the mapping table should be the same as the DPK received from the server 104. If the row is not present then there is an addition of the reference to a folder. In that case, connector 108 creates a new message in the client database 118 and inserts a row in the mapping table 122 for this new record. If a row is present in the mapping table 122, then it is a modification operation, and connector 108 opens each record in the client database and updates all the related records.

Deletion can be permanent deletion or deletion of a reference to a folder. In case of permanent deletion, connector 108 obtains the list of OPKs from the mapping table 122 and deletes all the related records in the client database 122. In case of deletion of a reference along with the DPK of the record, connector 108 obtains the DPK of the parent folder (PrDPK). Then connector 108 queries the mapping table 122 for the DPK and also checks whether its parent DPK equals PrDPK. If the parent DPK equals the PrDPK, then the connector deletes the record only in this folder and removes the entry in the mapping table 122 for this record.

Role of Mapping Table in Replication

For each folder (inbox, outbox, etc.) there is a record in the mapping table. The presence of a record for a folder in the mapping table helps connectors 108 decide whether there is a need to synchronize a particular folder corresponding to a folder in the server 104. By deleting the record for that folder in the mapping table, connector 108 prevents replication for that particular folder and its contents. For example, suppose that client 102 does not support synchronization of a "Journal folder" and its contents maintained by the server 104. Then, by deleting the folder's record from the mapping table, connector 108 is able stop synchronization associated with the Journal folder.

In connector 108, there are also scenarios where it there is a need to delete a record in the database 118, but there no corresponding to record in the server database 110. For example, on the client side, when receiving a meeting invitation there is a record in an inbox folder and also a record in the Calendar folder. But on the server side there is only one record corresponding to both items. To support this situation, connector 108 maintains two records in the mapping table 122 for the same DPK. If the user deletes the record in the Inbox, then connector 108 only deletes the entry in the mapping table 122 corresponding to the record in the Inbox.

FIG. 10 illustrates another implementation of the mapping table 122 with an extra field 1002 added. Apart from columns 702 and 704 extra information can be stored in additional fields such as extra field 1002. It should be noted, however, the memory usage will increase linearly with the number of fields added. The extra field 1002 is referred to as the OUTLOOK Object Type (OOT), which is used to determine whether a record corresponds to a folder or an e-mail record in the client database 118.

When connector 108 queries mapping table 122 to obtain the mapping between OPK and DPK folders, there is no need to query the entire table 122. Instead, connector 108 can obtain a view of the table 122, and then restrict the view to have only folder entries and then query the view. Accordingly, field 1002 helps to optimize the query operations.

FIG. 11 is a flow chart illustrating a process for replicating changes made to records between the disparate databases (118 and 110) through the use of the mapping table 122. Process 1100 includes a various operations illustrated as blocks. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on client 102.

Operating e-mail application program 106 on client 102 requires e-mail records (including folders and messages) to be stored in a hierarchical database. However, server 104 uses a database that stores records in a flat database as described above. It is necessary to map the e-mail records from both databases and store the mapping in the mapping table 122. This process permits there to be replication of actions that occur to records on the client 102 or server.

Accordingly, at a block 1102 DPKs from records stored on server database 110 are ascertained. This can be accomplished as described above through the construction of mapping table 122 (see e.g., FIG. 8). At a block 1104 client records are created that correspond to the server records. At a block 1106, OPKs associated with the created client records are obtained. The DPKs and OPKs are stored in the mapping table 122. At a block 1108 the OPKs and DPKs are used to located records in the mapping table so that when changes are made to client records or the server records, the changes can be replicated on either the client side or server side. Thus, process 1100 ensures that records on the client are synchronized with records on the server side and vice versa.

Figure 12:
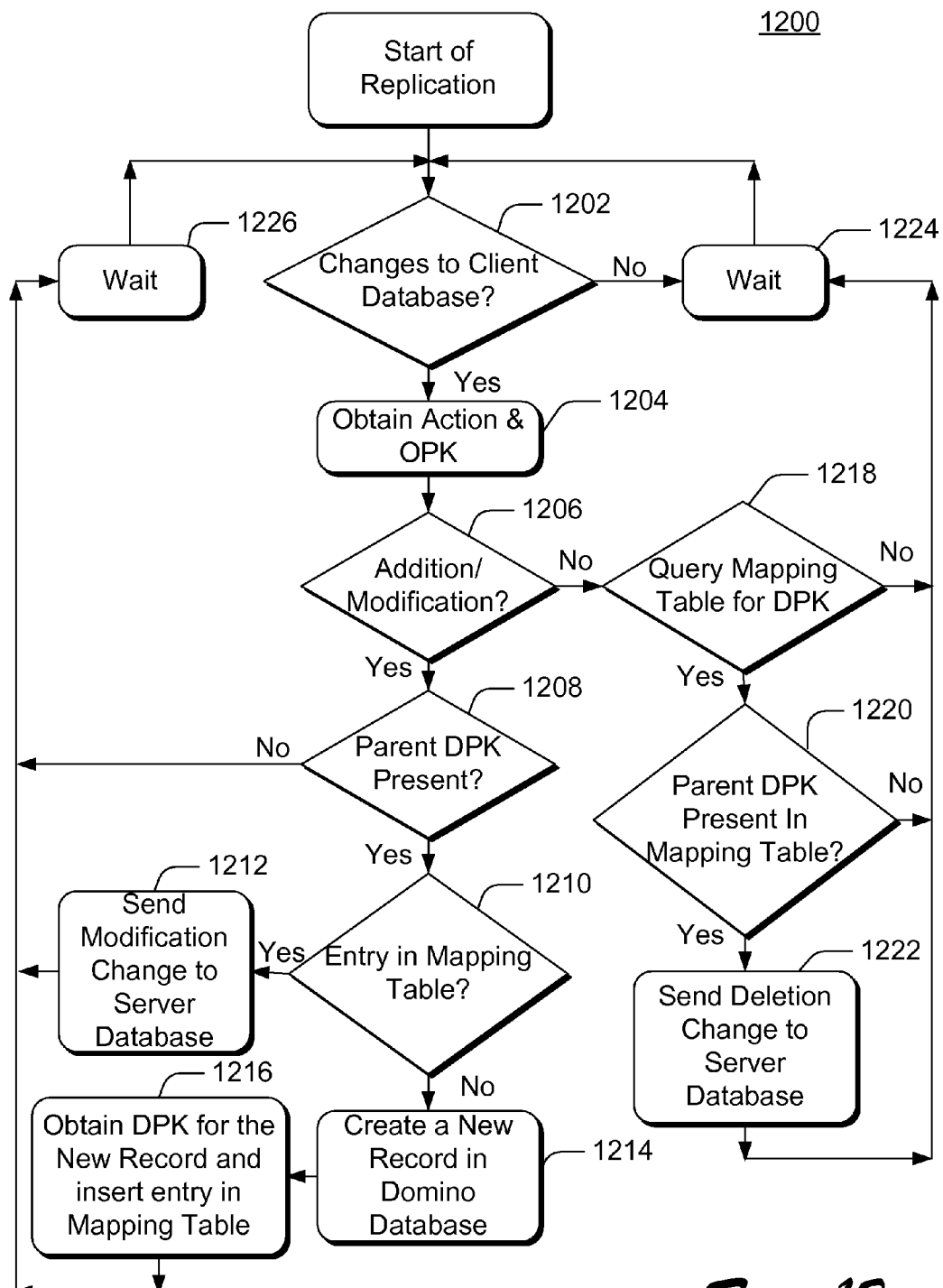
FIG. 12 is a flow chart illustrating a process for using the mapping table to replicate records from the client database to the server database.

FIG. 12 is a flow chart illustrating a process 1200 for using the mapping table to replicate records from the client database 118 to the server database 110. The order in which the process is described is not intended to be construed as a limitation. Furthermore, the process can be implemented in any suitable hardware, software, firmware, or combination thereof. In the exemplary implementation, the majority of operations are performed in software (such as in the form of modules or programs) running on client 102.

At a block 1202, replication thread module 120 monitors whether changes are made to records stored in client database 118. If no changes were made, then according to a block 1224 connector 108 waits for more time to pass and repeats block 1202.

If there are changes made to a record stored in client database 118, then according to a block 1204 the OPK and action performed on the record is obtained.

At a block 1206, connector 108 checks whether the action was an addition or a modification. If not addition/modification were made, then at a block 1218, the mapping table 122 is queried to ascertain whether there is a corresponding DPK (by deduction the action was a deletion). If there isn't a DPK then the deletion isn't supported by either e-mail application program 106 or server 104 and the change is not replicated on the server 104. On the hand, according to the Yes branch of block 1218, if there is a DPK in the mapping table 122, then at a block 1220 a determination is made whether the there is a parent DPK present in the mapping table 122. If there is not a parent DPK, then the server is not notified of the deletion change. On the other hand, at block 1220 if there is a parent DPK present, then according to a block 1220 the change is sent to server database 110.

Returning to block 1206, if there was no addition/modification made, then at a block 1208, a determination is made if there is a parent DPK present. If no parent DPK is present, then the change is not sent to the server 104. If at block 1208, there is a parent DPK parent, then at a block 12010 a determination is made whether there is an entry in the mapping table to a parent DPK. If there is such an entry, then at a block 1212 the change is sent to the server database 110.

On the hand, if there is no DPK entry present then at a block 1214 a new record is created in the server database corresponding to the change. At a block 1216, the DPK of the newly created record is obtained from the server 104 and inserted in the mapping table 122 as an entry corresponding to a record (folder or message).

Exemplary Computing System and Environment

Figure 13:
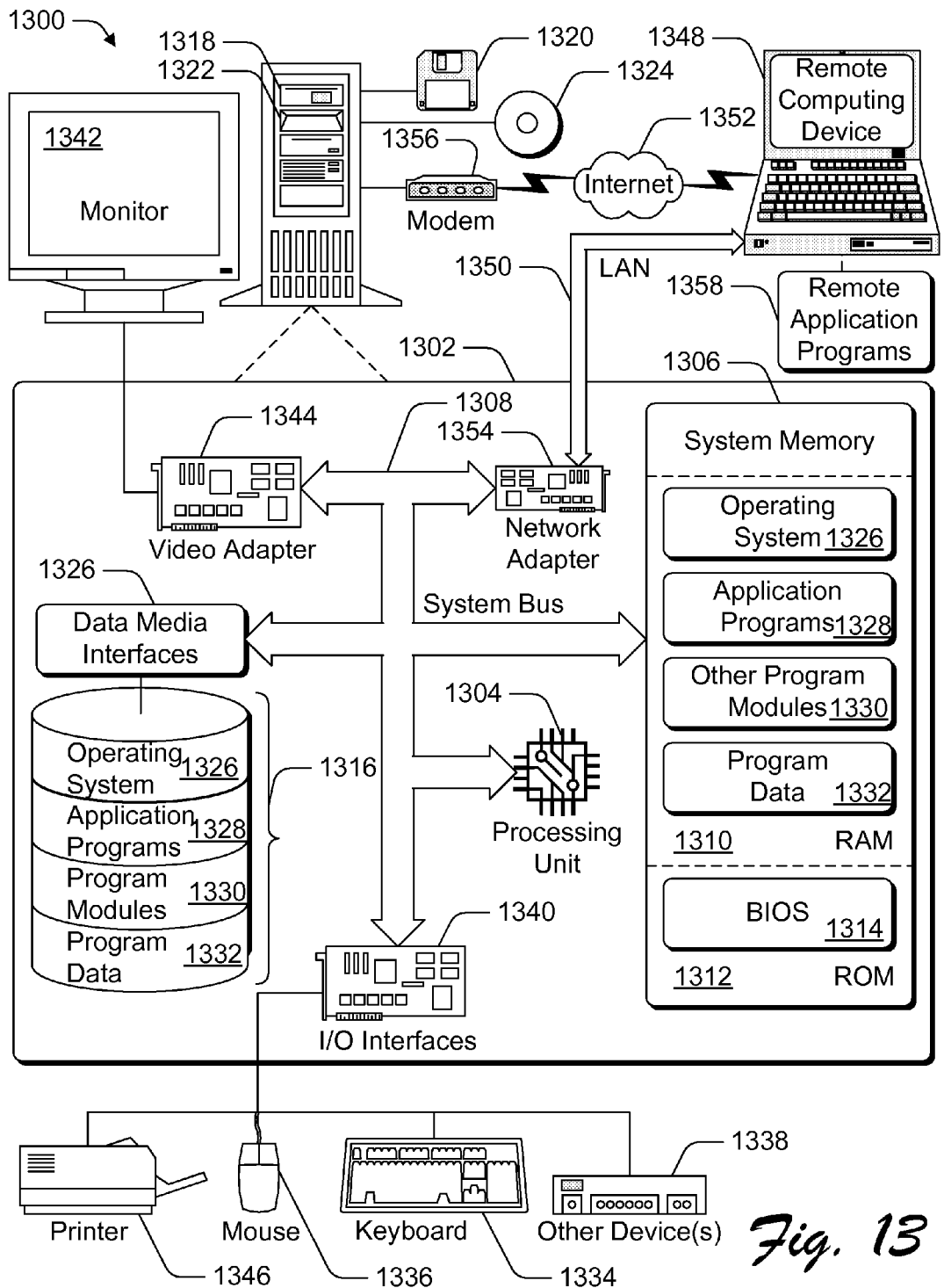
FIG. 13 illustrates an example of a computing environment within which the computer, network, and system architectures described herein can be either fully or partially implemented.

FIG. 13 illustrates an example of a computing environment 1300 within which the computer, network, and system architectures (such as e-mail system 100) described herein can be either fully or partially implemented. Exemplary computing environment 1300 is only one example of a computing system and is not intended to suggest any limitation as to the scope of use or functionality of the network architectures. Neither should the computing environment 1300 be interpreted as having any dependency or requirement relating to any one or combination of components illustrated in the exemplary computing environment 1300.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

Connector module 108 may be described in the general context of computer-executable instructions, such as program modules, being executed by a computer. Generally, program modules include routines, programs, objects, components, data structures, etc. that perform particular tasks or implement particular abstract data types.

The computing environment 1300 includes a general-purpose computing system in the form of a computer 1302 (e.g. client 102). The components of computer 1302 an include, by are not limited to, one or more processors or processing units 1304, a system memory 1306, and a system bus 1308 that couples various system components including the processor 1304 to the system memory 1306.

The system bus 1308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 1302 typically includes a variety of computer readable media. Such media can be any available media that is accessible by computer 1302 and includes both volatile and non-volatile media, removable and non-removable media. The system memory 1306 includes computer readable media in the form of volatile memory, such as random access memory (RAM) 1310, and/or non-volatile memory, such as read only memory (ROM) 1312. A basic input/output system (BIOS) 1314, containing the basic routines that help to transfer information between elements within computer 1302, such as during start-up, is stored in ROM 1312. RAM 1310 typically contains data and/or program modules that are immediately accessible to and/or presently operated on by the processing unit 1304.

Computer 1302 can also include other removable/non-removable, volatile/non-volatile computer storage media. By way of example, FIG. 13 illustrates a hard disk drive 1316 for reading from and writing to a non-removable, non-volatile magnetic media (not shown), a magnetic disk drive 1318 for reading from and writing to a removable, non-volatile magnetic disk 1320 (e.g., a "floppy disk"), and an optical disk drive 1322 for reading from and/or writing to a removable, non-volatile optical disk 1324 such as a CD-ROM, DVD-ROM, or other optical media. The hard disk drive 1316, magnetic disk drive 1318, and optical disk drive 1322 are each connected to the system bus 1308 by one or more data media interfaces 1326. Alternatively, the hard disk drive 1316, magnetic disk drive 518, and optical disk drive 1322 can be connected to the system bus 1308 by a SCSI interface (not shown).

The disk drives and their associated computer-readable media provide non-voltage storage of computer readable instructions, data structures, program modules, and other data for computer 1302. Although the example illustrates a hard disk 1316, a removable magnetic disk 1320, and a removable optical disk 1324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 1316, magnetic disk 1320, optical disk 1324, ROM 1312, and/or RAM 1310, including by way of example, an operating system 526, one or more application programs 1328, other program modules 1330, and program data 1332. Each of such operating system 1326, one or more application programs 1328, other program modules 1330, and program data 1332 (or some combination thereof) may include an embodiment of connector module 108 in conjunction with e-mail application program 106.

Computer system 1302 can include a variety of computer readable media identified as communications media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 1302 via input devices such as a keyboard 1334 and a pointing device 1336 (e.g., a "mouse"). Other inputs devices 1338 (not shown specifically) may include a microphone, joystick, game pad, satellite dish, serial port, scanner, and/or the like. These and other input devices are connected to the processing unit 1304 via input/output interfaces 1340 that are coupled to the system bus 1308, but may be connected by other interface and bus structures, such as a parallel port, game port, or a universal serial bus (USB).

A monitor 1342 or other type of display device can also be connected to the system bus 1308 via an interface, such as a video adapter 1344. In addition to the monitor 1342, other output peripheral devices can include components such as speakers (not shown) and a printer 1346 which can be connected to computer 1302 via the input/output interfaces 1340.

Computer 1302 can operate in a networked environment using logical connections to one or more remote computers, such as a remote computing device 1348. By way of example, the remote computing device 1348 can be a personal computer, portable computer, a server, a router, a network computer, a peer device or other common network node, and the like. The remote computing device 1348 is illustrated as a portable computer that can include many or all of the elements and features described herein relative to computer system 1302.

Logical connections between computer 1302 and the remote computer 1348 are depicted as a local area network (LAN) 1350 and a general wide area network (WAN) 1352. Such networking environments are commonplace in offices, enterprise-wide computer networks, intranets, and the Internet. When implemented in a LAN networking environment, the computer 1302 is connected to a local network 1350 via a network interface or adapter 1354. When implemented in a WAN networking environment, the computer 1302 typically includes a modem 1356 or other means for establishing communications over the wide network 1352. The modem 1356, which can be internal or external to computer 1302, can be connected to the system bus 1308 via the input/output interfaces 1340 or other appropriate mechanisms. It is to be appreciated that the illustrated network connections are exemplary and that other means of establishing communication link(s) between the computers 1302 and 1348 can be employed.

In a networked environment, such as that illustrated with computing environment 1300, program modules depicted relative to the computer 1302, or portions thereof, may be stored in a remote memory storage device. By way of example, remote application programs 1358 reside on a memory device of remote computer 1348. For purposes of illustration, application programs and other executable program components, such as the opening system, are illustrated herein as discrete blocks, although it is recognized that such programs and components reside at various times in different storage components of the computer system 1302, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, comprising:
    operating an e-mail application program on a client wherein e-mail records are stored in a hierarchical database;
    linking the client to a server wherein the server stores e-mail records in a flat database; and
    creating a mapping table that associates email records stored in the hierarchical database with corresponding e-mail records stored in the flat database.

2. The method as recited in claim 1, wherein a hierarchical database uses folders and subfolders to store the e-mail records.

3. The method as recited in claim 1, wherein the flat database uses a single folder to store the e-mail records.

4. The method as recited in claim 1, further comprising:
    ascertaining a server identification key for an e-mail record from the flat database;
    creating one or more new client records that correspond to the e-mail record from the flat database;
    assigning one or more client identification keys to each of the one or more new client records; and
    mapping each of the client identification keys to the server identification key.

5. One or more computer-readable media comprising computer-executable instructions that, when executed, perform the method as recited in claim 1.

6. A method, comprising: in a client, storing a server identification key and one or more client identification keys that correspond to the server identification key in a mapping table, wherein the server identification key uniquely identifies a server record from an e-mail server database and each of the one or more client identification keys uniquely identify client records stored in an e-mail client database that are related to the server record from the e-mail server database, wherein one of the e-mail sever database or the e-mail client database is a flat database while the other is a hierarchical database.

7. The method as recited in claim 6, replicating a change made to one or more of the client records stored in the e-mail client database, by using the mapping to locate the corresponding server record; and sending a message to notify the server database of the change to the server record.

8. The method as recited in claim 6, further comprising adding one or more additional fields to the mapping table that indicates whether a folder is associated with a client record.

9. The method as recited in claim 6, further comprising adding one or more additional fields to the mapping table that indicates whether a folder is associated with a client record; and
    if there is no folder associated with the client record, then not replicating any changes made to the client record.

10. A system, comprising:
    means for operating an e-mail application program on a client wherein e-mail records are stored in a hierarchical database;
    means for linking the client to a server wherein the server stores e-mail records in a flat database;
    means for mapping the e-mail records stored in the hierarchical database to the e-mail records stored in the flat database and vice versa; and
    means for storing the mapping in a mapping table.

11. The system as recited in claim 10, wherein a hierarchical database uses folders and subfolders to store the e-mail records.

12. The system as recited in claim 10, wherein the flat database uses a single folder to store the e-mail records.

13. The system as recited in claim 10, wherein the mapping of the e-mail records stored in the hierarchical database to the e-mail records stored in the flat database and vice versa, further comprises:
    means for ascertaining a server identification key for an e-mail record received from the flat database;

means for creating one or more new client records that correspond to the e-mail record received from the flat database;

means for assigning one or more client identification keys to each of the one or more new client records; and means for mapping each of the client identification keys to the server identification key.

14. One or more computer-readable media having stored thereon computer executable instructions that, when executed by one or more processors, causes the one or more processors of a computer system to:

operate an e-mail application program on a client wherein e-mail records are stored in a hierarchical database;

link the client to a server wherein the server stores e-mail records in a flat database;

map the e-mail records stored in the hierarchical database to the e-mail records stored in the flat database and vice versa; and store the mapping in a mapping table.

15. One or more computer-readable media as recited in claim 14, wherein the hierarchical database uses folders and subfolders to store the e-mail records.

16. One or more computer-readable media as recited in claim 14, wherein the flat databases uses a single folder to store the e-mail records.

17. One or more computer-readable media as recited in claim 14, further comprising computer executable instructions that, when executed, direct the computer system to:

ascertain a server identification key for an e-mail record from the flat database;

create one or more new client records that correspond to the e-mail record from the flat database;

assign one or more client identification keys to each of the one or more new client records; and map each of the client identification keys to the server identification key.

* * * * *